United States Patent
Ahn et al.

(10) Patent No.: US 11,967,679 B2
(45) Date of Patent: Apr. 23, 2024

(54) COMPOSITION FOR GEL POLYMER ELECTROLYTE AND LITHIUM SECONDARY BATTERY INCLUDING GEL POLYMER ELECTROLYTE FORMED THEREFROM

(71) Applicant: LG ENERGY SOLUTION, LTD., Seoul (KR)

(72) Inventors: Kyoung Ho Ahn, Daejeon (KR); Jung Hoon Lee, Daejeon (KR); Won Kyung Shin, Daejeon (KR); Jae Won Lee, Daejeon (KR); Min Jung Kim, Daejeon (KR); Chul Haeng Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 465 days.

(21) Appl. No.: 17/291,263

(22) PCT Filed: Nov. 6, 2019

(86) PCT No.: PCT/KR2019/014965
§ 371 (c)(1),
(2) Date: May 4, 2021

(87) PCT Pub. No.: WO2020/096343
PCT Pub. Date: May 14, 2020

(65) Prior Publication Data
US 2022/0085410 A1 Mar. 17, 2022

(30) Foreign Application Priority Data
Nov. 6, 2018 (KR) .................. 10-2018-0134836

(51) Int. Cl.
*H01M 10/0565* (2010.01)
*H01M 10/0525* (2010.01)

(52) U.S. Cl.
CPC ... *H01M 10/0565* (2013.01); *H01M 10/0525* (2013.01); *H01M 2300/0082* (2013.01); *H01M 2300/0085* (2013.01)

(58) Field of Classification Search
CPC ......... H01M 10/0525; H01M 10/0565; H01M 4/131; H01M 4/64; H01M 4/366
See application file for complete search history.

(56) References Cited

U.S. PATENT DOCUMENTS

| 10,243,239 B1 | 3/2019 | Ahn et al. |
| 2011/0318645 A1 | 12/2011 | Han et al. |
| 2014/0255792 A1 | 9/2014 | Cao et al. |
| 2017/0229735 A1 | 8/2017 | Ahn et al. |
| 2018/0342767 A1 | 11/2018 | Ahn et al. |
| 2020/0220212 A1 | 7/2020 | Ahn et al. |

FOREIGN PATENT DOCUMENTS

| CN | 108352569 A | 7/2018 |
| EP | 3203565 A1 | 8/2017 |
| EP | 3361546 A1 | 8/2018 |
| EP | 3654436 A1 | 5/2020 |
| EP | 3846272 A1 | 7/2021 |
| JP | 2001-297948 A | 10/2001 |
| JP | 2006-310071 A | 11/2006 |
| JP | 2011-154853 A | 8/2011 |
| KR | 10-2012-0000399 A | 1/2012 |
| KR | 10-2016-0040128 A | 4/2016 |
| KR | 10-2016-0077962 A | 7/2016 |
| KR | 10-2017-0044136 A | 4/2017 |
| KR | 10-1828127 B1 | 2/2018 |
| KR | 10-2018-0026358 A | 3/2018 |

OTHER PUBLICATIONS

Zhang et al., "Recent advances in solid polymer electrolytes for lithium batteries," Nano Research, 2017, vol. 10, No. 12, pp. 4139-4174.
Devaux et al., "Crosslinked perfluoropolyether solid electrolytes for lithium ion transport," Solid State Ionics, 2017, vol. 310, pp. 71-80.
Bao et al., "Polycarbonate-based polyurethane as a polymer electrolyte matrix for all-solid-state lithium batteries," Journal of Power Sources, 2018, vol. 389, pp. 84-92.
International Search Report (with partial translation) and Written Opinion issued in corresponding International Patent Application No. PCT/KR2019/014965, dated Feb. 18, 2020.
Extended European Search Report dated Sep. 30, 2021 issued by the European Patent Office for the corresponding European patent application No. 19883207.3.

*Primary Examiner* — Kenneth J Douyette
(74) *Attorney, Agent, or Firm* — Morgan, Lewis & Bockius LLP

(57) ABSTRACT

The present invention relates to a composition for a gel polymer electrolyte, which includes a lithium salt, a non-aqueous organic solvent, a polymerization initiator, and an oligomer containing a polycarbonate-based repeating unit, a gel polymer electrolyte in which mechanical strength and ion transfer capability are improved by polymerization of the composition for a gel polymer electrolyte, and a lithium secondary battery in which external impact and stability during high-temperature storage are improved by including the gel polymer electrolyte.

11 Claims, No Drawings

COMPOSITION FOR GEL POLYMER ELECTROLYTE AND LITHIUM SECONDARY BATTERY INCLUDING GEL POLYMER ELECTROLYTE FORMED THEREFROM

CROSS-REFERENCE TO RELATED APPLICATIONS

This application claims priority from Korean Patent Application No. 2018-0134836, filed on Nov. 6, 2018, the disclosure of which is incorporated by reference herein.

TECHNICAL FIELD

The present invention relates to a composition for a gel polymer electrolyte and a lithium secondary battery including a gel polymer electrolyte formed therefrom.

BACKGROUND ART

Recently, there is a growing demand for high performance, high stability secondary batteries as electric, electronic, communication, and computer industries have rapidly developed. Particularly, in line with miniaturization and lightweight trends of electronic and communication devices, thin-film and miniaturized lithium secondary batteries, as core components in this field, are required.

Lithium secondary batteries may be divided into a lithium ion battery using a liquid electrolyte and a lithium polymer battery using a polymer electrolyte depending on the electrolyte used.

The lithium ion battery is advantageous in that it has high capacity, but the lithium ion battery is disadvantageous in that, since the liquid electrolyte containing a lithium salt is used, there is a risk of leakage and explosion and battery design is complicated to prepare for the risk.

In contrast, with respect to the lithium polymer battery, since a solid polymer electrolyte or a gel polymer electrolyte containing an electrolyte solution is used as the electrolyte, stability is improved and, simultaneously, flexibility is obtained, and thus, the lithium polymer battery may be developed in various forms, for example, in the form of small or thin-film batteries. Particularly, in a case in which the gel polymer electrolyte is used, a side reaction between the electrolyte and a surface of an electrode may be suppressed, and, since the number of components and materials required for ensuring high-temperature durability and stability of the lithium secondary battery may be reduced, a cost reduction effect may also be expected.

A secondary battery, in which the gel polymer electrolyte is used, may be prepared by the following two methods.

First, after an electrolyte solution composition is prepared by mixing an oligomer or monomer polymerizable with a polymerization initiator in an organic solvent in which an electrolyte salt is dissolved, the electrolyte solution composition is injected into a battery case accommodating an electrode assembly, and gelation (crosslinking) is performed at an appropriate temperature to prepare the secondary battery.

However, with respect to the above method, since a process for maintaining the temperature required for the gelation is required, there are resultant economic and time losses. Also, since pre-gelation sometimes occurs at room temperature before injecting the composition into the battery depending on the composition of the polymerization initiator and the polymerizable monomer or oligomer, it is not only not easy to perform the injection process, but it may also cause a problem in which overall performance of the battery is degraded due to a decrease in wetting of the battery.

As another method, after the electrolyte solution composition is coated on one surface or both surfaces of one of an electrode and a separator and curing (gelation) is performed by using heat or ultraviolet (UV) light to prepare a gel polymer electrolyte, an electrode assembly, which is prepared by winding or stacking the electrode and/or the separator on which the gel polymer electrolyte is formed, is inserted into a battery case, and the secondary battery may be prepared by reinjecting a conventional liquid electrolyte solution thereinto.

Recently, in line with the increasing demand for secondary batteries having high output and high capacity such as secondary batteries for an electric vehicle, there is a need to develop a lithium secondary battery which includes an electrolyte capable of suppressing a side reaction between the electrolyte solution and the electrode in harsh environments such as high temperature, or preventing fire or explosion by ensuring high thermal and chemical stabilities.

PRIOR ART DOCUMENT

Korean Patent Application Laid-open Publication No. 2012-0000399

Korean Patent Application Laid-open Publication No. 2016-0077962

DISCLOSURE OF THE INVENTION

Technical Problem

An aspect of the present invention provides a composition for a gel polymer electrolyte which includes a polymerizable oligomer including a polycarbonate group as a repeating unit.

Another aspect of the present invention provides a gel polymer electrolyte having improved oxidation stability which is prepared by polymerization of the composition for a gel polymer electrolyte.

Another aspect of the present invention provides a lithium secondary battery in which high-temperature storage stability is improved by including the gel polymer electrolyte.

Technical Solution

According to an aspect of the present invention, there is provided a composition for a gel polymer electrolyte which includes:

a lithium salt, a non-aqueous organic solvent, a polymerization initiator, and an oligomer, wherein the oligomer includes at least one selected from the group consisting of oligomers represented by Formula 1 and Formula 2 below.

[Formula 1]

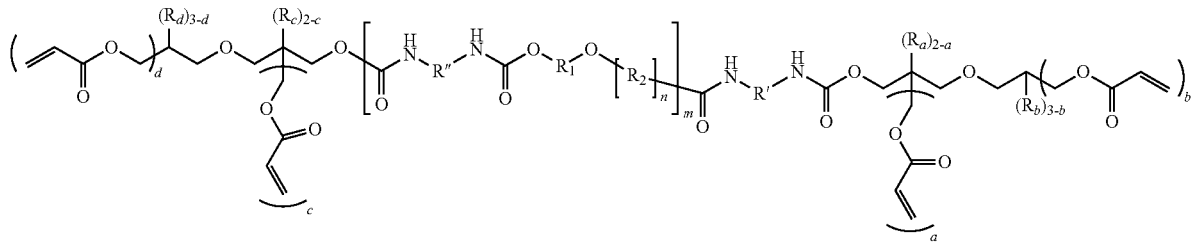

In Formula 1,

R' and R" are each independently an aliphatic hydrocarbon group or an aromatic hydrocarbon group, $R_1$ is a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, a substituted or unsubstituted heterocycloalkylene group having 2 to 20 carbon atoms, —CO—O—R— (where R is an alkylene group having 1 to 10 carbon atoms), —$R_o$—CO— (where $R_o$ is an alkylene group having 1 to 10 carbon atoms), or —$R_i$—O—$R'_i$— (where $R_i$ and $R'_i$ are each independently a substituted or unsubstituted alkylene group having 1 to 10 carbon atoms), $R_2$ is —CO—O—$R_3$—O— (where $R_3$ is a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, a substituted or unsubstituted heterocycloalkylene group having 2 to 20 carbon atoms, —CO—O—R— (where R is an alkylene group having 1 to 10 carbon atoms), —$R_j$—CO— (where $R_j$ is an alkylene group having 1 to 10 carbon atoms), or —$R_k$—O—$R'_k$— (where $R_k$ and $R'_k$ are each independently a substituted or unsubstituted alkylene group having 1 to 10 carbon atoms)), or —$R_4$—CO—O— (where $R_4$ is a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, or a substituted or unsubstituted heterocycloalkylene group having 2 to 20 carbon atoms), $R_a$, $R_b$, $R_c$, and $R_d$ are each independently hydrogen or an alkyl group having 1 to 3 carbon atoms, n and m are the numbers of repeating units, wherein n is an integer of 1 to 100, and m is an integer of 1 to 100, a and c are each independently an integer of 0 to 2, and b and d are each independently an integer of 1 to 3.

[Formula 2]

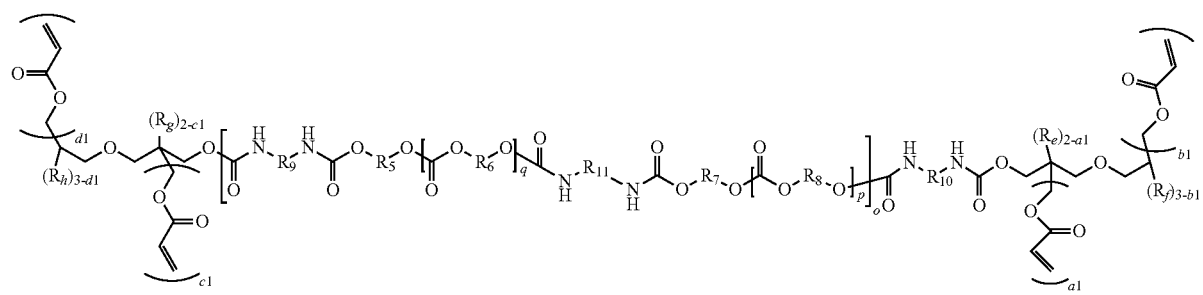

In Formula 2, $R_5$, $R_6$, $R_7$, and $R_8$ are each independently a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, a substituted or unsubstituted heterocycloalkylene group having 2 to 20 carbon atoms, —CO—O—$R_m$— (where $R_m$ is an alkylene group having 1 to 10 carbon atoms), —$R_n$—CO— (where $R_n$ is an alkylene group having 1 to 10 carbon atoms), or —$R_{12}$—O—$R_{13}$-(where $R_{12}$ and $R_{13}$ are each independently a substituted or unsubstituted alkylene group having 1 to 10 carbon atoms), $R_9$, $R_{10}$, and $R_{11}$ are each independently an aliphatic hydrocarbon group or an aromatic hydrocarbon group, $R_e$, $R_f$, $R_g$, and $R_h$ are each independently hydrogen or an alkyl group having 1 to 3 carbon atoms, o, p, and q are the numbers of repeating units, wherein o is an integer of 1 to 100, p is an integer of 1 to 100, and q is an integer of 1 to 100, a1 and c1 are each independently an integer of 0 to 2, and b1 and d1 are each independently an integer of 1 to 3.

According to another aspect of the present invention, there is provided a gel polymer electrolyte prepared by polymerization of the composition for a gel polymer electrolyte of the present invention.

According to another aspect of the present invention, there is provided a lithium secondary battery including the gel polymer electrolyte of the present invention.

Advantageous Effects

Since an oligomer included in a composition for a gel polymer electrolyte of the present invention contains a polycarbonate group, as a repeating unit, as well as an acrylate group, as a hydrophilic group, and a urethane group in its structure, the oligomer may improve wetting of the composition for a gel polymer electrolyte and may form a stable film on a surface of a positive electrode at high temperature.

Accordingly, in a case in which the composition for a gel polymer electrolyte including the oligomer is used, a gel polymer electrolyte, in which oxidation stability is improved by suppressing a side reaction between the positive electrode and an electrolyte solution, may be prepared. Also, a lithium secondary battery having improved high-temperature storage stability may be prepared by including the gel polymer electrolyte.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Before describing the present invention, the expression "alkylene group" in the specification denotes a branched or unbranched divalent unsaturated hydrocarbon group. In an embodiment, the alkylene group may be substituted or unsubstituted. The alkylene group includes a methylene group, an ethylene group, a propylene group, an isopropylene group, a butylene group, an isobutylene group, a tert-butylene group, a pentylene group, and 3-pentylene group, but the alkylene group is not limited thereto, and each thereof may be optionally substituted in another exemplary embodiment.

Also, the expressions "a" and "b" in the description of "a to b carbon atoms" in the specification of the present invention each denote the number of carbon atoms included in a specific functional group. That is, the functional group may include "a" to "b" carbon atoms. For example, the expression "alkylene group having 1 to 5 carbon atoms" denotes an alkylene group including 1 to 5 carbon atoms, that is, $-CH_2-$, $-CH_2CH_2-$, $-CH_2CH_2CH_2-$, $-CH_2(CH_2)CH-$, $-CH(CH_2)CH_2-$, and $-CH(CH_2)CH_2CH_2-$.

Furthermore, unless otherwise defined in the specification, the expression "substitution" denotes that at least one hydrogen bonded to carbon is substituted with an element other than hydrogen, for example, an alkyl group having 1 to 5 carbon atoms or a fluorine element.

Also, it will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

Composition for Gel Polymer Electrolyte

A composition for a gel polymer electrolyte is provided in the present specification.

The composition for a gel polymer electrolyte includes a lithium salt, a non-aqueous organic solvent, a polymerization initiator, and an oligomer, wherein the oligomer includes at least one selected from the group consisting of oligomers represented by Formula 1 and Formula 2 below.

[Formula 1]

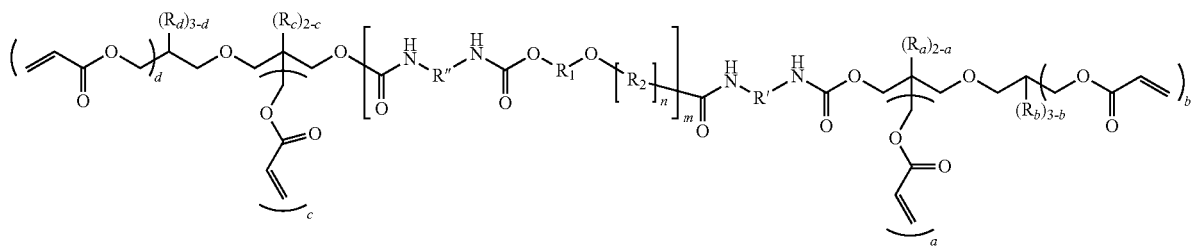

In Formula 1,

R' and R" are each independently an aliphatic hydrocarbon group or an aromatic hydrocarbon group, $R_1$ is a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, a substituted or unsubstituted heterocycloalkylene group having 2 to 20 carbon atoms, $-CO-O-R-$ (where R is an alkylene group having 1 to 10 carbon atoms), $-R_o-CO-$ (where $R_o$ is an alkylene group having 1 to 10 carbon atoms), or $-R_i-O-R'_i-$ (where $R_i$ and $R'_i$ are each independently a substituted or unsubstituted alkylene group having 1 to 10 carbon atoms), $R_2$ is $-CO-O-R_3-O-$ (where $R_3$ is a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, a substituted or unsubstituted heterocycloalkylene group having 2 to 20 carbon atoms, $-CO-O-R-$ (where R is an alkylene group having 1 to 10 carbon atoms), $-R_j-CO-$ (where $R_j$ is an alkylene group having 1 to 10 carbon atoms), or $-R_k-O-R'_k-$ (where $R_k$ and $R'_k$ are each independently a substituted or unsubstituted alkylene group having 1 to 10 carbon atoms)), or —$R_4$—CO—O— (where $R_4$ is a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, or a substituted or unsubstituted heterocycloalkylene group having 2 to 20 carbon atoms), $R_a$, $R_b$, $R_c$, and $R_d$ are each independently hydrogen or an alkyl group having 1 to 3 carbon atoms, n and m are the numbers of repeating units, wherein n is an integer of 1 to 100, and m is an integer of 1 to 100, a and c are each independently an integer of 0 to 2, and b and d are each independently an integer of 1 to 3.

$(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion.

One or a mixture of two or more thereof, if necessary, may be used as the lithium salt. The lithium salt may be appropriately changed in a normally usable range, but may be included in a concentration of 1.0 M to 5 M, for example, 1.5 M to 4 M in the composition for a gel polymer electrolyte to obtain an optimum effect of forming a film for preventing corrosion of a surface of an electrode.

The composition for a gel polymer electrolyte of the present invention may reduce resistance due to the depletion of lithium ions during high-rate charge and discharge by

[Formula 2]

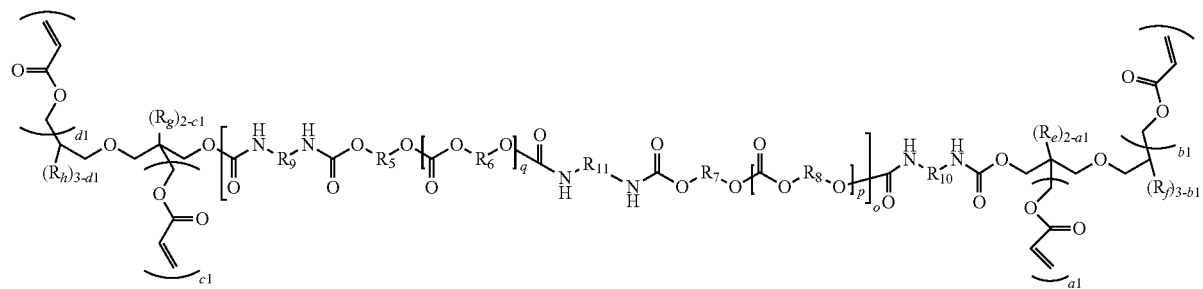

In Formula 2, $R_5$, $R_6$, $R_7$, and $R_8$ are each independently a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, a substituted or unsubstituted heterocycloalkylene group having 2 to 20 carbon atoms, —CO—O—$R_m$— (where $R_m$ is an alkylene group having 1 to 10 carbon atoms), —$R_n$—CO— (where $R_n$ is an alkylene group having 1 to 10 carbon atoms), or —$R_{12}$—O—$R_{13}$—(where $R_{12}$ and $R_{13}$ are each independently a substituted or unsubstituted alkylene group having 1 to 10 carbon atoms), $R_9$, $R_{10}$, and $R_{11}$ are each independently an aliphatic hydrocarbon group or an aromatic hydrocarbon group, $R_e$, $R_f$, $R_g$, and $R_h$ are each independently hydrogen or an alkyl group having 1 to 3 carbon atoms, o, p, and q are the numbers of repeating units, wherein o is an integer of 1 to 100, p is an integer of 1 to 100, and q is an integer of 1 to 100, a1 and c1 are each independently an integer of 0 to 2, and b1 and d1 are each independently an integer of 1 to 3.

Hereinafter, components of the composition for a gel polymer electrolyte of the present invention will be described.

(1) Lithium Salt

First, in the composition for a gel polymer electrolyte according to the present invention, the lithium salt is used as an electrolyte salt in the lithium secondary battery, wherein it is used as a medium for transferring ions. Typically, the lithium salt may include $Li^+$ as a cation, and may include one selected from the group consisting of $F^-$, $Cl^-$, $Br^-$, $I^-$, $NO_3^-$, $N(CN)_2^-$, $ClO_4^-$, $BF_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, including the electrolyte salt in a concentration of 1.5 M or more. Furthermore, in a case in which the concentration of the electrolyte salt in the composition for a gel polymer electrolyte of the present invention satisfies the above range, lithium cation ($Li^+$) transfer characteristics (that is, cation transference number) may be secured due to an increase in lithium cations present in the composition for a gel polymer electrolyte, and an effect of reducing diffusion resistance of the lithium ions may be achieved to obtain an effect of improving cycle capacity characteristics. In a case in which the concentration of the electrolyte salt is 5 M or less, an increase in viscosity of the electrolyte may be prevented while securing a movement speed of the lithium ions. If, in a case in which the maximum concentration of the electrolyte salt is greater than 5 M, since viscosity of the composition for a gel polymer electrolyte is excessively increased to degrade wetting properties of the electrolyte, overall performance of the secondary battery may be degraded.

(2) Non-Aqueous Organic Solvent

The non-aqueous organic solvent is not limited as long as it may minimize decomposition due to an oxidation reaction during charge and discharge of the secondary battery and may exhibit desired characteristics with an additive. For example, as the non-aqueous organic solvent, a carbonate-based organic solvent, an ether-based organic solvent, or an ester-based organic solvent may be used alone or in mixture of two or more thereof.

The carbonate-based organic solvent among the organic solvents may include at least one selected from a cyclic carbonate-based organic solvent and a linear carbonate-based organic solvent. Specifically, the cyclic carbonate-based organic solvent may include at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), and may specifically include a mixed solvent of ethylene carbonate having high permittivity and propylene carbonate having a relatively lower melting point than the ethylene carbonate.

Also, the linear carbonate-based organic solvent, as a solvent with low viscosity and low permittivity, may include at least one selected from the group consisting of dimethyl carbonate (DMC), diethyl carbonate (DEC), dipropyl carbonate, ethylmethyl carbonate (EMC), methylpropyl carbonate, and ethylpropyl carbonate, and may specifically include dimethyl carbonate.

As the ether-based organic solvent, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

The ester-based organic solvent may include at least one selected from the group consisting of a linear ester-based organic solvent and a cyclic ester-based organic solvent.

Specific examples of the linear ester-based organic solvent may be any one selected from the group consisting of methyl acetate, ethyl acetate, propyl acetate, methyl propionate, ethyl propionate, propyl propionate, and butyl propionate, or a mixture of two or more thereof, but the present invention is not limited thereto.

Specific examples of the cyclic ester-based organic solvent may be any one selected from the group consisting of γ-butyrolactone, γ-valerolactone, γ-caprolactone, σ-valerolactone, and ε-caprolactone, or a mixture of two or more thereof, but the present invention is not limited thereto.

A highly viscous cyclic carbonate-based organic solvent, which well dissociates the lithium salt in the electrolyte due to high permittivity, may be used as the non-aqueous organic solvent. Also, in order to prepare an electrolyte having higher electrical conductivity, the above cyclic carbonate-based organic solvent may be mixed with a low viscosity, low permittivity linear carbonate-based compound, such as dimethyl carbonate and diethyl carbonate, and a linear ester-based compound in an appropriate ratio and used as the organic solvent.

In the composition for a gel polymer electrolyte of the present invention, the organic solvent may be included such that a concentration of a solid content composed of the lithium salt and the oligomer is in a range of 70 wt % or less, particularly 50 wt % or less, and more particularly 10 wt % or less based on a total weight of the composition for a gel polymer electrolyte.

(3) Oligomer

Also, the composition for a gel polymer electrolyte of the present invention may include at least one oligomer.

The oligomer is a compound having a crosslinkable substituent which may form a polymer matrix, a basic skeleton of the gel polymer electrolyte, while being oxidized by polymerization when the temperature rises, wherein it may include at least one of oligomers represented by Formula 1 and Formula 2 which contain at least one acrylate group at its end.

Specifically, in the oligomer represented by Formula 1, R' and R" may be aliphatic hydrocarbon groups. The aliphatic hydrocarbon group may include at least one selected from the group consisting of an alicyclic hydrocarbon group and a linear hydrocarbon group.

The alicyclic hydrocarbon group may include at least one selected from the group consisting of a substituted or unsubstituted cycloalkylene group having 4 to 20 carbon atoms; a substituted or unsubstituted cycloalkenylene group having 4 to 20 carbon atoms; and a substituted or unsubstituted heterocycloalkylene group having 2 to 20 carbon atoms. Also, the linear hydrocarbon group may include at least one selected from the group consisting of a substituted or unsubstituted alkylene group having 1 to 20 carbon atoms; a substituted or unsubstituted alkoxylene group having 1 to 20 carbon atoms; a substituted or unsubstituted alkenylene group having 2 to 20 carbon atoms; and a substituted or unsubstituted alkynylene group having 2 to 20 carbon atoms.

Furthermore, in the oligomer represented by Formula 1, R' and R" may be an aromatic hydrocarbon group. The aromatic hydrocarbon group may include at least one selected from the group consisting of a substituted or unsubstituted arylene group having 6 to 20 carbon atoms; and a substituted or unsubstituted heteroarylene group having 4 to 20 carbon atoms.

Also, in the oligomer represented by Formula 1, $R_1$ may be at least one selected from the group consisting of a substituted or unsubstituted alkylene group having 2 to 8 carbon atoms, a substituted or unsubstituted cycloalkylene group having 4 to 10 carbon atoms, a substituted or unsubstituted arylene group having 6 to 15 carbon atoms, a substituted or unsubstituted heterocycloalkylene group having 2 to 10 carbon atoms, —CO—O—R— (where R is an alkylene group having 2 to 8 carbon atoms), —$R_o$—CO— (where $R_o$ is an alkylene group having 2 to 8 carbon atoms), and —$R_1$—O—$R'_i$— (where $R_2$ and $R'_i$ are each independently a substituted or unsubstituted alkylene group having 1 to 8 carbon atoms).

Furthermore, in the oligomer represented by Formula 1, $R_2$ may be —CO—O—$R_3$—O— (where $R_3$ is a substituted or unsubstituted alkylene group having 2 to 8 carbon atoms, a substituted or unsubstituted cycloalkylene group having 4 to 10 carbon atoms, a substituted or unsubstituted arylene group having 6 to 15 carbon atoms, a substituted or unsubstituted heterocycloalkylene group having 2 to 10 carbon atoms, —CO—O—R— (where R is an alkylene group having 1 to 10 carbon atoms), —$R_j$—CO— (where $R_j$ is an alkylene group having 2 to 8 carbon atoms), or —$R_k$—O—$R'_k$— (where $R_k$ and $R'_k$ are each independently a substituted or unsubstituted alkylene group having 1 to 8 carbon atoms)), or —$R_4$—CO—O— (where $R_4$ is a substituted or unsubstituted alkylene group having 2 to 8 carbon atoms, a substituted or unsubstituted cycloalkylene group having 4 to 10 carbon atoms, a substituted or unsubstituted arylene group having 6 to 15 carbon atoms, or a substituted or unsubstituted heterocycloalkylene group having 2 to 10 carbon atoms).

Specifically, in the oligomer represented by Formula 1, $R_1$ may be at least one selected from the group consisting of a propylene group, a butylene group, a pentylene group, a hexylene group, a cyclopentylene group, a cyclohexylene group, —CO—O—$(CH_2)_5$—, —$(CH_2CH_2OCH_2CH_2)_r$— (where r is an integer of 1 to 10), and —$(CH_2)_5$—CO—, and $R_2$ may be at least one selected from the group consisting of —CO—O—$R_3$—O— (where $R_3$ is a propylene group, a butylene group, a pentylene group, a hexylene group, a cyclopentylene group, a cyclohexylene group, or —$(CH_2CH_2OCH_2CH_2)_{r1}$— (where r1 is an integer of 1 to 10)) and —$(CH_2)_5$—CO—O—, wherein $R_1$ and $R_2$ may be the same or different from each other.

Also, in the oligomer represented by Formula 1, a molar ratio of n:m, which are the numbers of repeating units, may be in a range of 1:0.01 to 1:100, for example, 1:0.1 to 1:50.

In a case in which the molar ratio of m, as the number of repeating units, to 1 mol of n, as the number of repeating units, is less than 0.01, efficiency of dissociating the lithium (Li) salt may be reduced to cause a phenomenon of decreasing ionic conductivity, and, in a case in which the molar ratio of m, as the number of repeating units, to 1 mol of n, as the number of repeating units, is greater than 100, contact characteristics with respect to the electrode may be degraded to significantly increase interfacial resistance during cell configuration.

Specifically, the oligomer represented by Formula 1 may include at least one selected from the group consisting of compounds represented by Formula 1a to Formula 1c below.

atoms; a substituted or unsubstituted cycloalkenylene group having 4 to 20 carbon atoms; and a substituted or unsubstituted heterocycloalkylene group having 2 to 20 carbon atoms. Also, the linear hydrocarbon group may include at least one selected from the group consisting of a substituted or unsubstituted alkylene group having 1 to 20 carbon atoms; a substituted or unsubstituted alkoxylene group having 1 to 20 carbon atoms; a substituted or unsubstituted alkenylene group having 2 to 20 carbon atoms; and a substituted or unsubstituted alkynylene group having 2 to 20 carbon atoms.

[Formula 1a]

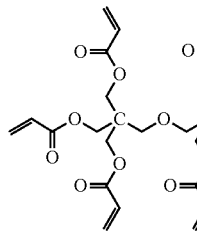 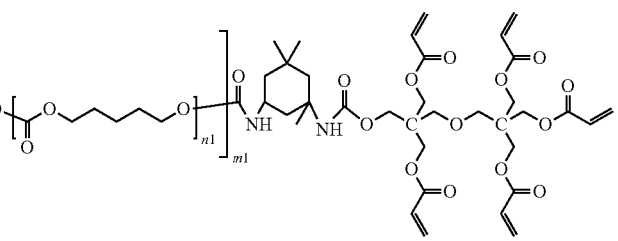

Formula 1a,
n1 is an integer of 1 to 100, and
m1 is an integer of 1 to 100.

[Formula 1b]

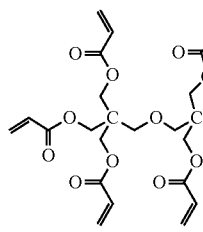 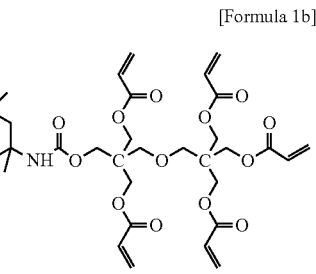

In Formula 1b,
n2 is an integer of 1 to 100, and
m2 is an integer of 1 to 100.

Furthermore, in the oligomer represented by Formula 2, $R_9$, $R_{10}$, and $R_{11}$ may be aromatic hydrocarbon groups. The aromatic hydrocarbon group may include at least one

[Formula 1c]

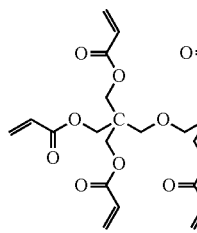 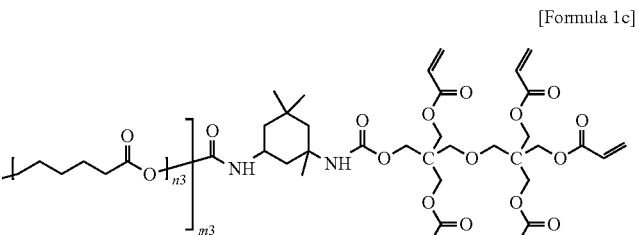

In Formula 1c,
n3 is an integer of 1 to 100, and
m3 is an integer of 1 to 100.

Furthermore, in the oligomer represented by Formula 2, $R_9$, $R_{10}$, and $R_{11}$ may be aliphatic hydrocarbon groups. The aliphatic hydrocarbon group may include at least one selected from the group consisting of an alicyclic hydrocarbon group and a linear hydrocarbon group.

The alicyclic hydrocarbon group may include at least one selected from the group consisting of a substituted or unsubstituted cycloalkylene group having 4 to 20 carbon selected from the group consisting of a substituted or unsubstituted arylene group having 6 to 20 carbon atoms; and a substituted or unsubstituted heteroarylene group having 4 to 20 carbon atoms.

Also, in the oligomer represented by Formula 2, $R_5$, $R_6$, $R_7$, and $R_8$ may each independently be a substituted or unsubstituted alkylene group having 2 to 8 carbon atoms, a substituted or unsubstituted cycloalkylene group having 4 to 10 carbon atoms, a substituted or unsubstituted arylene group having 6 to 15 carbon atoms, a substituted or unsubstituted heterocycloalkylene group having 2 to 10 carbon atoms, —CO—O—$R_m$— (where $R_m$ is an alkylene group having 2 to 8 carbon atoms), —$R_n$—CO— (where $R_n$ is an alkylene group having 2 to 8 carbon atoms), or —$R_{12}$—O—$R_{13}$— (where $R_{12}$ and $R_{13}$ are each independently a substituted or unsubstituted alkylene group having 1 to 8 carbon atoms).

Specifically, in the oligomer represented by Formula 2, $R_5$, $R_6$, $R_7$, and $R_8$ may each independently be at least one selected from the group consisting of a propylene group, a butylene group, a pentylene group, a hexylene group, a cyclopentylene group, a cyclohexylene group, —CO—O—$(CH_2)_5$—, —$(CH_2CH_2OCH_2CH_2)_{r2}$— (where r2 is an integer of 1 to 10), and —$(CH_2)_5$—CO—, wherein $R_5$, $R_6$, $R_7$, and $R_8$ may be the same or different from each other.

Furthermore, in the oligomer represented by Formula 2, a molar ratio of (p+q):o, which are the numbers of repeating units, may be in a range of 1:0.01 to 1:100, for example, 1:0.1 to 1:50.

Also, a molar ratio of q:p, which are the numbers of repeating units, may be in a range of 1:0.11 to 1:9, for example, 1:0.5 to 1:8.

In a case in which the molar ratio of o, as the number of repeating units, to 1 mol of (p+q), as the number of repeating units, is less than 0.01, the efficiency of dissociating the Li salt may be reduced to cause the phenomenon of decreasing the ionic conductivity, and, in a case in which the molar ratio of o, as the number of repeating units, to 1 mol of (p+q), as the number of repeating units, is greater than 100, the contact characteristics with respect to the electrode may be degraded to significantly increase the interfacial resistance during cell configuration. Furthermore, in a case in which the molar ratio of p, as the number of repeating units, to 1 mol of q, as the number of repeating units, is greater than 9, a polymerization reaction rate may be reduced.

Specifically, the oligomer represented by Formula 2 may include a compound represented by Formula 2a below.

Also, in the gel polymer electrolyte of the present invention, the oligomer may include the oligomer represented by Formula 1 and the oligomer represented by Formula 2 in a weight ratio of 1:99 to 100:0, for example, 50:50 to 100:0.

With respect to a polymer having a skeleton of alkylene oxide which has been used during the preparation of a conventional gel polymer electrolyte, since oxidation stability is low, a film, which is easily broken at high temperature, is formed on a surface of a positive electrode during initial charge. The film is disadvantageous in that it not only causes a side reaction to increase interfacial resistance between the electrode and the electrolyte, but also causes gas generation and cell swelling during high-temperature storage to increase the risk of heat generation or explosion.

In contrast, with respect to the oligomer represented by Formula 1 or Formula 2 of the present invention, since an acrylate group, as a hydrophilic part, and a urethane group are present together in its structure, it may reduce surface tension with the electrode by acting as a surfactant in the composition for a gel polymer electrolyte, and thus, the interfacial resistance may be improved. Accordingly, an effect of improving the wetting of the composition for a gel polymer electrolyte with respect to the electrode and the separator may be obtained.

Particularly, since the oligomer of the present invention may exhibit a balanced affinity for a hydrophilic part (positive electrode, separator (SRS layer)) and a hydrophobic part (negative electrode, separator fabric) in the battery by including a polycarbonate group as a repeating unit in the structure, it may form a stable film on the surface of the electrode at high temperature. That is, since a stable film is formed on the surface of the positive electrode at high temperature while oxygen of the polycarbonate group is adsorbed on the surface of the positive electrode in which oxygen is lost, exposure to the electrolyte may be prevented.

[Formula 2a]

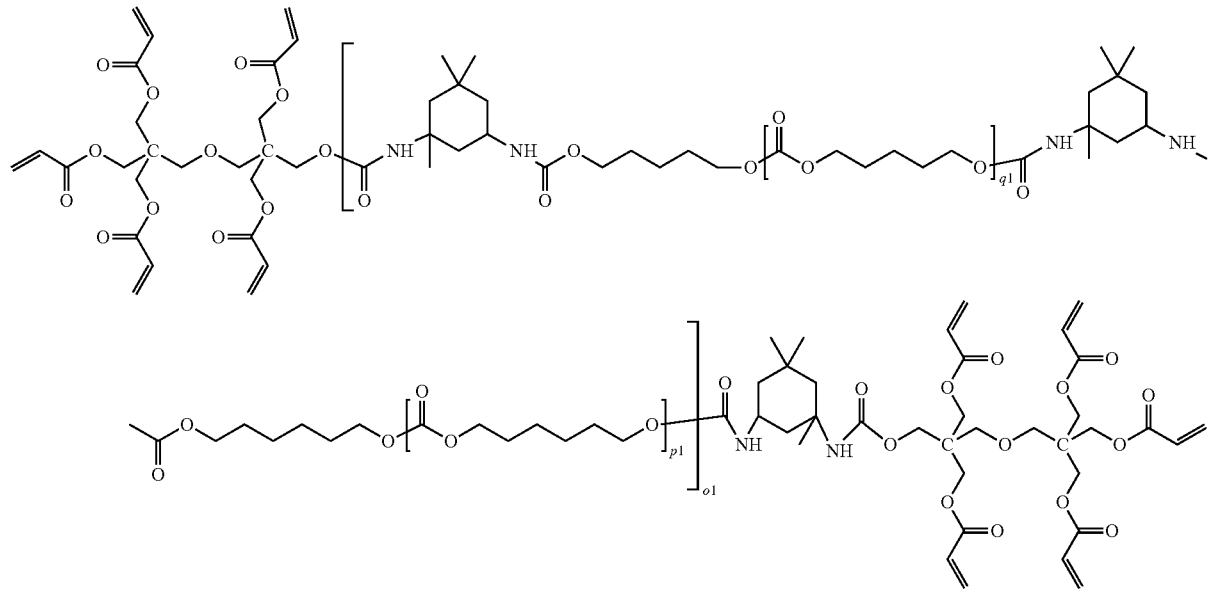

In Formula 2a,
o1 is an integer of 1 to 100,
p1 is an integer of 1 to 100, and
q1 is an integer of 1 to 100.

Thus, when the composition for a gel polymer electrolyte including the oligomer represented by Formula 1 or Formula 2 of the present invention is used, a gel polymer electrolyte having improved oxidation stability may be formed by suppressing a side reaction between the positive electrolyte and the electrolyte. Also, since the gel polymer electrolyte forms a robust and stable solid electrolyte interface (SEI) on the surface of the negative electrode while being reduced during operation of the battery, durability and high-temperature storage characteristics of the battery may be improved. Therefore, in the present invention, a lithium secondary battery having improved overall performance, such as stability during high-temperature storage, may be achieved.

The oligomer may be included in an amount of 0.1 wt % to 35 wt %, particularly 0.5 wt % to 30 wt %, and more particularly 1 wt % to 30 wt %, for example, 1 wt % to 20 wt % based on a total weight of the composition for a gel polymer electrolyte.

If the amount of the oligomer represented by Formula 1 included is within the above range, that is, 0.1 wt %, particularly 0.5 wt % or more, a polymer matrix by the oligomer may be easily formed and a polymer network having excellent mechanical strength may be formed. Also, if the amount of the oligomer is 35 wt % or less, specifically 30 wt % or less, and particularly 20 wt % or less, it is possible to prevent disadvantages such as an increase in resistance due to the excessive amount of the oligomer added and limitation of movement of lithium ions, for example, a decrease in ionic conductivity, and wetting of the gel polymer electrolyte may be improved while securing proper viscosity.

If, in a case in which the amount of the oligomer is greater than 35 wt %, the ionic conductivity is relatively reduced, and capacity characteristics may be degraded as the interfacial resistance increases.

Also, a weight-average molecular weight (MW) of the oligomer represented by Formula 1 may be controlled by the number of repeating units, and may be in a range of about 1.000 g/mol to about 1,500,000 g/mol, particularly 1,000 g/mol to 500,000 g/mol, and more particularly 1,000 g/mol to 100.000 g/mol, for example, 5,000 g/mol to 50,000 g/mol. In a case in which the weight-average molecular weight of the oligomer is within the above range, mechanical strength of the gel polymer electrolyte including the oligomer may be effectively improved.

If the weight-average molecular weight of the oligomer represented by Formula 1 is less than 1,000 g/mol, since adequate mechanical strength may not be expected and the use of a greater amount of a polymerization initiator is required to form numerous crosslinks or a demanding additional polymerization process is required, a gel polymer electrolyte formation process may be complicated. If the weight-average molecular weight of the oligomer is greater than 1,500,000 g/mol, since physical properties of the oligomer itself become rigid and the affinity with the electrolyte solvent is decreased, dissolution is difficult, and thus, the formation of a uniform and excellent gel polymer electrolyte may not be expected.

The weight-average molecular weight may be measured by using a gel permeation chromatography (GPC) instrument, and, unless otherwise specified, a molecular weight may denote the weight-average molecular weight. For example, in the present invention, the GPC conditions are as follows: the weight-average molecular weight is measured by using 1200 series by Agilent Technologies, a PL mixed B column by Agilent Technologies may be used in this case, and tetrahydrofuran (THF) may be used as a solvent.

(4) Polymerization Initiator

The composition for a gel polymer electrolyte of the present invention may include a polymerization initiator to perform a radical reaction required during the preparation of the gel polymer electrolyte.

A conventional thermal or photopolymerization initiator known in the art may be used as the polymerization initiator. For example, the polymerization initiator forms a radical by being dissociated by heat, and may react with the oligomer represented by Formula 1 or 2 by free radical polymerization to form a gel polymer electrolyte.

Specifically, non-limiting examples of the polymerization initiator may be organic peroxides or hydroperoxides, such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, and one or more azo compounds selected from the group consisting of 2,2'-azobis(2-cyanobutane), 2,2'-azobis(methylbutyronitrile), 2,2'-azobis(iso-butyronitrile) (AIBN), and 2,2'-azobis-dimethyl-valeronitrile (AMVN), but the polymerization initiator is not limited thereto.

The polymerization initiator forms a radical by being dissociated by heat, for a non-limiting example, heat at 30° C. to 100° C. in the battery or by being dissociated at room temperature (5° C. to 30° C.), and the polymerizable oligomer may react with an acrylate-based compound by free radical polymerization to form a gel polymer electrolyte.

Also, the polymerization initiator may be included in an amount of 0.01 part by weight to 20 parts by weight, for example, 0.1 part by weight to 10 parts by weight based on 100 parts by weight of the oligomer.

In a case in which the amount of the polymerization initiator is within a range of 0.01 part by weight to 20 parts by weight, gel polymer electrolyte properties may be secured by increasing a gel polymer conversion rate, and the wetting of the composition for a gel polymer electrolyte with respect to the electrode may be improved by preventing a pre-gel reaction.

(5) Additive

Also, in order to prevent a gel polymer electrolyte from being decomposed during the preparation of the gel polymer electrolyte to cause collapse of a negative electrode in a high output environment, or further improve low-temperature high-rate discharge characteristics, high-temperature stability, overcharge protection, and an effect of improving swelling during high-temperature storage, the composition for a gel polymer electrolyte of the present invention may further include an additional additive capable of forming a more stable ion conductivity film on the surface of the electrode, if necessary.

Specifically, typical examples of the additional additive may include at least one first additive selected from the group consisting of a sultone-based compound, a sulfite-based compound, a sulfone-based compound, a sulfate-based compound, a halogen-substituted carbonate-based compound, a nitrile-based compound, a cyclic carbonate-based compound, a phosphate-based compound, a borate-based compound, and a lithium salt-based compound.

The sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone, and may be included in an amount of 0.3 wt % to 5 wt %, for example, 1 wt % to 5 wt % based on the total weight of the composition for a gel polymer electrolyte. In a case in which the amount of the sultone-based compound in the composition for a gel polymer electrolyte is greater than 5 wt %, an excessively thick film may be formed on the surface of the electrode to cause an increase in resistance and a degradation of output, and resistance due to the excessive amount of the additive in the composition for a gel polymer electrolyte may be increased to degrade output characteristics.

The sulfite-based compound may include at least one compound selected from the group consisting of ethylene sulfite, methylethylene sulfite, ethylethylene sulfite, 4,5-dimethylethylene sulfite, 4,5-diethylethylene sulfite, propylene sulfite, 4,5-dimethylpropylene sulfite, 4,5-diethylpropylene sulfite, 4,6-dimethylpropylene sulfite, 4,6-diethylpropylene sulfite, and 1,3-butylene glycol sulfite, and may be included in an amount of 3 wt % or less based on the total weight of the composition for a gel polymer electrolyte.

The sulfone-based compound may include at least one compound selected from the group consisting of divinyl sulfone, dimethyl sulfone, diethyl sulfone, methylethyl sulfone, and methylvinyl sulfone, and may be included in an amount of 3 wt % or less based on the total weight of the composition for a gel polymer electrolyte.

The sulfate-based compound may include ethylene sulfate (Esa), trimethylene sulfate (TMS), or methyl trimethylene sulfate (MTMS), and may be included in an amount of 3 wt % or less based on the total weight of the composition for a gel polymer electrolyte.

Also, the halogen-substituted carbonate-based compound may include fluoroethylene carbonate (FEC), and may be included in an amount of 5 wt % or less based on the total weight of the composition for a gel polymer electrolyte. In a case in which the amount of the halogen-substituted carbonate-based compound in the composition for a gel polymer electrolyte is greater than 5 wt %, cell swelling inhibition performance may be degraded.

Furthermore, the nitrile-based compound may include at least one compound selected from the group consisting of succinonitrile, adiponitrile (Adn), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The cyclic carbonate-based compound may include vinylene carbonate (VC) or vinyl ethylene carbonate, and may be included in an amount of 3 wt % or less based on the total weight of the composition for a gel polymer electrolyte. In a case in which the amount of the cyclic carbonate-based compound in the composition for a gel polymer electrolyte is greater than 3 wt %, cell swelling inhibition performance may be degraded.

The phosphate-based compound may include at least one compound selected from the group consisting of lithium difluoro (bisoxalato)phosphate, lithium difluorophosphate, tris(trimethylsilyl) phosphate, tris(2,2,2-trifluoroethyl) phosphate, and tris(trifluoroethyl) phosphate, and may be included in an amount of 3 wt % or less based on the total weight of the composition for a gel polymer electrolyte.

The borate-based compound may include lithium oxalyldifluoroborate, and may be included in an amount of 3 wt % or less based on the total weight of the composition for a gel polymer electrolyte.

The lithium salt-based compound is a compound different from the lithium salt included in the composition for a gel polymer electrolyte, wherein the lithium salt-based compound may include at least one compound selected from the group consisting of $LiPO_2F_2$, LiODFB, LiBOB (lithium bis(oxalato)borate ($LiB(C_2O_4)_2$)), and $LiBF_4$, and may be included in an amount of 3 wt % or less based on the total weight of the composition for a gel polymer electrolyte.

Two types or more of the additional additives may be mixed and included in an amount of 20 wt % or less, for example, 0.1 wt % to 10 wt % based on the total weight of the composition for a gel polymer electrolyte. If the amount of the additional additive is less than 0.01 wt %, effects of improving low-temperature output, high-temperature storage characteristics, and high-temperature life characteristics of the battery are insignificant, and, if the amount of the additional additive is greater than 20 wt %, there is a possibility that a side reaction in the composition for a gel polymer electrolyte occurs excessively during charge and discharge of the battery. Particularly, since the additives may not be sufficiently decomposed at high temperatures, the additives may be present in the form of an unreacted material or precipitates in the composition for a gel polymer electrolyte at room temperature. Accordingly, a side reaction may occur in which life or resistance characteristics of the secondary battery are degraded.

Gel Polymer Electrolyte

Next, in the present invention, a gel polymer electrolyte, which is prepared by polymerization of the composition for a gel polymer electrolyte using a conventionally known polymerization method, may be provided.

A gelation method for preparing the gel polymer electrolyte of the present invention is not particularly limited, but may be performed according to a conventional method known in the art.

Specifically, after preparing a composition for a gel polymer electrolyte which includes a lithium salt, an organic solvent, and at least one oligomer selected from the oligomers represented by Formula 1 and Formula 2, a gel polymer electrolyte including a polymer matrix may be prepared by injecting the composition into a battery and performing a polymerization reaction. Also, after forming a polymer matrix by performing the polymerization reaction, a gel polymer electrolyte may be prepared by further impregnation with a non-aqueous electrolyte solution including an electrolyte salt and an organic solvent.

The polymerization reaction may be performed through a conventional heating, electron beam (e-beam), or γ-ray process. If, in a case in which the polymerization reaction is thermal polymerization, it takes about 1 hour to about 8 hours, and may be performed in a temperature range of 50° C. to 100° C.

Conventional gelation is inconvenient that oxygen in the atmosphere, as a radical scavenger, must be blocked by typically performing radical polymerization under an inert condition. In the present invention, in a case in which an oxygen scavenger is included in the gel polymer electrolyte composition, it is advantageous in that the polymerization reaction for preparing the gel polymer electrolyte may be performed even in the presence of normal air or oxygen. That is, since the oxygen scavenger improves reactivity of the oligomers by reducing the influence of the oxygen during the polymerization reaction, an extent of reaction may be increased to such a degree that a large amount of unreacted monomer is almost not present. As a result, disadvantages, such as charge and discharge performance degradation that occurs while the unreacted monomer typically remains in the battery, may be improved. Particularly, the oxygen scavenger may further provide a flame retardant strengthening effect of the gel polymer electrolyte by containing a flame retardant functional group.

Lithium Secondary Battery

Furthermore, according to the present invention, a lithium secondary battery including the above-described gel polymer electrolyte may be provided, and the lithium secondary battery may include a positive electrode including a positive electrode active material, a negative electrode including a negative electrode active material, a separator disposed between the positive electrode and the negative electrode, and the above-described gel polymer electrolyte.

In this case, the lithium secondary battery of the present invention may be prepared according to a conventional method known in the art. For example, the lithium secondary battery of the present invention may be prepared by disposing a porous separator between a positive electrode and a negative electrode and injecting an electrolyte in which a lithium salt is dissolved. In this case, those typically used in the preparation of a lithium secondary battery may all be used as the positive electrode, negative electrode, and separator which constitute an electrode assembly.

(1) Positive Electrode

First, the positive electrode may be prepared by forming a positive electrode material mixture layer on a positive electrode collector. The positive electrode material mixture layer may be prepared by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. More specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-z}Ni_zO_4$ (where $0<Z<2$), etc.), lithium-nickel-cobalt-based oxide (e.g., $LiNi_{1-Y1}Co_{Y1}O_2$ (where $0<Y1<1$), etc.), lithium-manganese-cobalt-based oxide (e.g., $LiCo_{1-Y2}Mn_{Y2}O_2$ (where $0<Y2<1$), $LiMn_{2-Z1}Co_{z1}O_4$ (where $0<Z1<2$), etc.), lithium-nickel-manganese-cobalt-based oxide (e.g., Li $(Ni_pCo_qMn_{r1})$ $O_2$ (where $0<p<1$, $0<q<1$, $0<r1<1$, and $p+q+r1=1$) or Li $(Ni_{p1}Co_{q1}Mn_{r2})$ $O_4$ (where $0<p1<2$, $0<q1<2$, $0<r2<2$, and $p1+q1+r2=2$), etc.), or lithium-nickel-cobalt-transition metal (M) oxide (e.g., Li $(Ni_{p2}Co_{q2}Mn_{r3}M_{S2})$ $O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., Li $(Ni_{1/3}Mn_{1/3}Co_{1/3})O_2$, $Li(Ni_{0.6}Mn_{0.2}CO_{0.2})$ $O_2$, $Li(Ni_{0.5}Mn_{0.3}Co_{0.2})$ $O_2$, Li $(Ni_{0.7}Mn_{0.15}Co_{0.15})$ $O_2$, and Li $(Ni_{0.8}Mn_{0.1}Co_{0.1})$ $O_2$), or lithium nickel cobalt aluminum oxide (e.g., $LiNi_{0.8}Co_{0.15}Al_{0.05}O_2$, etc.).

The positive electrode active material may be included in an amount of 80 wt % to 99 wt % based on a total weight of solid content in the positive electrode slurry.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene termonomer (EPDM), a sulfonated EPDM, a styrene-butadiene rubber, a fluoro rubber, various copolymers, and the like.

The conductive agent is commonly added in an amount of 1 wt % to 30 wt % based on the total weight of the solid content in the positive electrode slurry.

The conductive agent is not particularly limited as long as it has conductivity without causing adverse chemical changes in the battery, and, for example, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include an organic solvent, such as N-methyl-2-pyrrolidone (NMP), and may be used in an amount such that desirable viscosity is obtained when the positive electrode active material as well as optionally the binder and the conductive agent are included. For example, the solvent may be included in an amount such that a concentration of the solid content in the slurry including the positive electrode active material as well as optionally the binder and the conductive agent is in a range of 50 wt % to 95 wt %, for example, 70 wt % to 90 wt %.

(2) Negative Electrode

Also, the negative electrode may be prepared by forming a negative electrode material mixture layer on a negative electrode collector. The negative electrode material mixture layer may be formed by coating the negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

One selected from the group consisting of $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), Fe, lead (Pb), or germanium (Ge); Me': Al, boron (B), phosphorus (P), silicon (Si), Groups I, II and III elements of the periodic table, or halogen; $0 < x \leq 1$; $1 \leq y \leq 3$; $1 \leq z \leq 8$) may be used as the metal composite oxide.

The material, which may be doped and undoped with lithium, may include Si, $SiO_x$ ($0 < x \leq 2$), a Si—Y alloy (where Y is an element selected from the group consisting of alkali metal, alkaline earth metal, a Group 13 element, a Group 14 element, transition metal, a rare earth element, and a combination thereof, and is not Si), tin (Sn), $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, calcium (Ca), strontium (Sr), barium (Ba), radium (Ra), scandium (Sc), yttrium (Y), Ti, zirconium (Zr), hafnium (Hf), rutherfordium (Rf), V, niobium (Nb), Ta, dubnium (db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), B, Al, gallium (Ga), Sn, indium (In), Ge, P, arsenic (As), antimony (Sb), bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene monomer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. One, which is the same as or different from the conductive agent used during the preparation of the positive electrode, may be used as the conductive agent, and, for example, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as optionally the binder and the conductive agent are included. For example, the solvent may be included in an amount such that a concentration of the solid content including the negative electrode active material as well as optionally the binder and the conductive agent is in a range of 50 wt % to 95 wt %, for example, 70 wt % to 90 wt %.

(3) Separator

Also, the separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

A shape of the lithium secondary battery of the present invention is not particularly limited, but a cylindrical type using a can, a prismatic type, a pouch type, or a coin type may be used.

EXAMPLES

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

Example 1

A non-aqueous organic solvent was prepared by dissolving LiFSI in dimethyl carbonate (DMC) to have a concentration of 2.0 M. A composition for a gel polymer electrolyte was prepared by adding 3 g of the oligomer represented by Formula 1a (weight-average molecular weight (Mw) 20,000, n1:m1=1:12.4) and 0.04 g of AIBN, as a polymerization initiator, to 96.96 g of the non-aqueous organic solvent (see Table 1 below).

Example 2

A non-aqueous organic solvent was prepared by dissolving LiFSI in dimethyl carbonate (DMC) to have a concentration of 2.0 M. A composition for a gel polymer electrolyte was prepared by adding 20 g of the oligomer represented by Formula 1a (weight-average molecular weight (Mw) 20,000, n1:m1=1:12.4) and 0.1 g of AIBN, as a polymerization initiator, to 79.9 g of the non-aqueous organic solvent (see Table 1 below).

Example 3

A non-aqueous organic solvent was prepared by dissolving LiFSI in dimethyl carbonate (DMC) to have a concentration of 2.0 M. A composition for a gel polymer electrolyte was prepared by adding 3 g of the oligomer represented by Formula 1b (weight-average molecular weight (Mw) 21,500, n2:m2=1:12.5) and 0.04 g of AIBN, as a polymerization initiator, to 96.96 g of the non-aqueous organic solvent (see Table 1 below).

Example 4

A non-aqueous organic solvent was prepared by dissolving LiFSI in dimethyl carbonate (DMC) to have a concentration of 2.0 M. A composition for a gel polymer electrolyte was prepared by adding 20 g of the oligomer represented by Formula 1b (weight-average molecular weight (Mw) 21,500, n2:m2=1:12.5) and 0.1 g of AIBN, as a polymerization initiator, to 79.9 g of the non-aqueous organic solvent (see Table 1 below).

Example 5

A non-aqueous organic solvent was prepared by dissolving LiFSI in dimethyl carbonate (DMC) to have a concentration of 2.0 M. A composition for a gel polymer electrolyte was prepared by adding 3 g of the oligomer represented by Formula 1c (weight-average molecular weight (Mw) 22,000, n3:m3=1:11.5) and 0.04 g of AIBN, as a polymerization initiator, to 96.96 g of the non-aqueous organic solvent (see Table 1 below).

Example 6

A non-aqueous organic solvent was prepared by dissolving LiFSI in dimethyl carbonate (DMC) to have a concentration of 2.0 M. A composition for a gel polymer electrolyte was prepared by adding 20 g of the oligomer represented by Formula 1c (weight-average molecular weight (Mw) 22,000, n3:m3=1:11.5) and 0.1 g of AIBN, as a polymerization initiator, to 79.9 g of the non-aqueous organic solvent (see Table 1 below).

Example 7

A non-aqueous organic solvent was prepared by dissolving LiFSI in dimethyl carbonate (DMC) to have a concentration of 2.0 M. A composition for a gel polymer electrolyte was prepared by adding 1.5 g of the oligomer represented by Formula 1a (weight-average molecular weight (Mw) 20,000, n1:m1=1:12.4), 1.5 g of the oligomer represented by Formula 1b (weight-average molecular weight (Mw) 21,500, n2:m2=1:12.5), and 0.04 g of AIBN, as a polymerization initiator, to 96.96 g of the non-aqueous organic solvent (see Table 1 below).

Example 8

A non-aqueous organic solvent was prepared by dissolving LiFSI in dimethyl carbonate (DMC) to have a concentration of 2.0 M. A composition for a gel polymer electrolyte was prepared by adding 20 g of the oligomer represented by Formula 1b (weight-average molecular weight (Mw) 27,000, n2:m2=1:18.4) and 0.1 g of AIBN, as a polymerization initiator, to 79.9 g of the non-aqueous organic solvent (see Table 1 below).

Example 9

A non-aqueous organic solvent was prepared by dissolving LiFSI in dimethyl carbonate (DMC) to have a concentration of 2.0 M. A composition for a gel polymer electrolyte was prepared by adding 30 g of the oligomer represented by Formula 1a (weight-average molecular weight (Mw) 20,000, n1:m1=1:12.4) and 0.12 g of AIBN, as a polymerization initiator, to 69.88 g of the non-aqueous organic solvent (see Table 1 below).

Example 10

A non-aqueous organic solvent was prepared by dissolving LiFSI in dimethyl carbonate (DMC) to have a concentration of 2.0 M. A composition for a gel polymer electrolyte was prepared by adding 3 g of the oligomer represented by Formula 1a (weight-average molecular weight (Mw) 13,000, n1:m1=1:20) and 0.04 g of AIBN, as a polymerization initiator, to 96.96 g of the non-aqueous organic solvent (see Table 1 below).

Example 11

A non-aqueous organic solvent was prepared by dissolving LiFSI in dimethyl carbonate (DMC) to have a concentration of 2.0 M. A composition for a gel polymer electrolyte was prepared by adding 3 g of the oligomer represented by Formula 1a (weight-average molecular weight (Mw) 18,000, n1:m1=1:30) and 0.04 g of AIBN, as a polymerization initiator, to 96.96 g of the non-aqueous organic solvent (see Table 1 below).

Example 12

A non-aqueous organic solvent was prepared by dissolving LiFSI in dimethyl carbonate (DMC) to have a concentration of 2.0 M. A composition for a gel polymer electrolyte was prepared by adding 3 g of the oligomer represented by Formula 1a (weight-average molecular weight (Mw) 11,000, n1:m1=1:6.5) and 0.04 g of AIBN, as a polymerization initiator, to 96.96 g of the non-aqueous organic solvent (see Table 1 below).

Example 13

A non-aqueous organic solvent was prepared by dissolving LiFSI in dimethyl carbonate (DMC) to have a concentration of 2.0 M. A composition for a gel polymer electrolyte was prepared by adding 0.5 g of the oligomer represented by Formula 1a (weight-average molecular weight (Mw) 20,000, n1:m1=1:12.4) and 0.05 g of AIBN, as a polymerization initiator, to 99.45 g of the non-aqueous organic solvent (see Table 1 below).

Example 14

A non-aqueous organic solvent was prepared by dissolving LiFSI in dimethyl carbonate (DMC) to have a concentration of 2.0 M. A composition for a gel polymer electrolyte was prepared by adding 36 g of the oligomer represented by Formula 1a (weight-average molecular weight (Mw) 20,000, n1:m1=1:12.4) and 1 g of AIBN, as a polymerization initiator, to 63 g of the non-aqueous organic solvent (see Table 1 below).

Comparative Example 1

A non-aqueous organic solvent was prepared by dissolving LiFSI in dimethyl carbonate (DMC) to have a concentration of 2.0 M. A composition for a gel polymer electrolyte was prepared by adding 3 g of trimethylolpropane ethoxylate triacrylate and 0.04 g of AIBN, as a polymerization initiator, to 96.96 g of the non-aqueous organic solvent (see Table 1 below).

Comparative Example 2

A non-aqueous organic solvent was prepared by dissolving LiFSI in dimethyl carbonate (DMC) to have a concentration of 2.0 M. A composition for a gel polymer electrolyte was prepared by adding 3 g of trimethylolpropane propoxylate triacrylate and 0.04 g of AIBN, as a polymerization initiator, to 96.96 g of the non-aqueous organic solvent (see Table 1 below).

Comparative Example 3

A non-aqueous organic solvent was prepared by dissolving LiFSI in dimethyl carbonate (DMC) to have a concentration of 2.0 M. A composition for a gel polymer electrolyte was prepared by adding 3 g of dipentaerythritol pentaacrylate and 0.04 g of AIBN, as a polymerization initiator, to 96.96 g of the non-aqueous organic solvent (see Table 1 below).

Comparative Example 4

A non-aqueous organic solvent was prepared by dissolving LiFSI in dimethyl carbonate (DMC) to have a concentration of 2.0 M. A composition for a gel polymer electrolyte was prepared by adding 3 g of diethylene glycol diacrylate and 0.04 g of AIBN, as a polymerization initiator, to 96.96 g of the non-aqueous organic solvent (see Table 1 below).

Comparative Example 5

A non-aqueous organic solvent was prepared by dissolving LiFSI in dimethyl carbonate (DMC) to have a concentration of 2.0 M (see Table 1 below).

TABLE 1

| | Non-aqueous organic solvent amount (g) | Oligomer Formula | Weight-average molecular weight (Mw) | Amount added (g) | Polymerization initiator amount (g) |
|---|---|---|---|---|---|
| Example 1 | 96.96 | 1a (n1:m1 = 1:12.4) | 20,000 | 3 | 0.04 |
| Example 2 | 79.9 | 1a (n1:m1 = 1:12.4) | 20,000 | 20 | 0.1 |
| Example 3 | 96.96 | 1b (n2:m2 = 1:12.5) | 21,500 | 3 | 0.04 |
| Example 4 | 79.9 | 1b (n2:m2 = 1:12.5) | 21,500 | 20 | 0.1 |
| Example 5 | 96.96 | 1c (n3:m3 = 1:11.5) | 22,000 | 3 | 0.04 |
| Example 6 | 79.9 | 1c (n3:m3 = 1:11.5) | 22,000 | 20 | 0.1 |
| Example 7 | 96.96 | 1a (n1:m1 = 1:12.4) | 20,000 | 1.5 | 0.04 |
| | | 1b (n2:m2 = 1:12.5) | 21,500 | 1.5 | |
| Example 8 | 79.9 | 1b (n2:m2 = 1:18.4) | 27,000 | 20 | 0.1 |
| Example 9 | 69.88 | 1a (n1:m1 = 1:12.4) | 20,000 | 30 | 0.12 |
| Example 10 | 96.96 | 1a (n1:m1 = 1:20) | 13,000 | 3 | 0.04 |
| Example 11 | 96.96 | 1a (n1:m1 = 1:30) | 18,000 | 3 | 0.04 |
| Example 12 | 96.96 | 1a (n1:m1 = 1:6.5) | 11,000 | 3 | 0.04 |
| Example 13 | 99.45 | 1a (n1:m1 = 1:12.4) | 20,000 | 0.5 | 0.05 |
| Example 14 | 63 | 1a (n1:m1 = 1:12.4) | 20,000 | 36 | 1 |
| Comparative Example 1 | 96.96 | trimethylolpropane ethoxylate triacrylate | — | 3 g | 0.04 |
| Comparative Example 2 | 96.96 | trimethylolpropane propoxylate triacrylate | — | 3 g | 0.04 |
| Comparative Example 3 | 96.96 | dipentaerythritol pentaacrylate | — | 3 g | 0.04 |

TABLE 1-continued

| | Non-aqueous organic solvent amount (g) | Oligomer Formula | Weight-average molecular weight (Mw) | Amount added (g) | Polymerization initiator amount (g) |
|---|---|---|---|---|---|
| Comparative Example 4 | 96.96 | diethylene glycol diacrylate | — | 3 | 0.04 |
| Comparative Example 5 | 100 | — | — | — | — |

Experimental Example 1: Oxidation Stability Evaluation Test

Electrochemical (oxidation) stabilities of the compositions for a gel polymer electrolyte prepared in Examples 1 to 14 and the compositions for a gel polymer electrolyte prepared in Comparative Examples 1 to 4 were measured using linear sweep voltammetry (LSV).

The measurement was made by using a potentiostat (EG&G, model 270A) under a three-electrode system (working electrode: platinum disk, counter electrode: platinum, reference electrode: lithium metal), and measurement temperature was 60° C. The results thereof are presented in Table 2 below.

TABLE 2

| | Oxidation stability (V) @60° C. |
|---|---|
| Example 1 | 5.65 |
| Example 2 | 5.75 |
| Example 3 | 5.77 |
| Example 4 | 5.80 |
| Example 5 | 5.70 |
| Example 6 | 5.80 |
| Example 7 | 5.75 |
| Example 8 | 5.85 |
| Example 9 | 5.90 |
| Example 10 | 5.62 |
| Example 11 | 5.60 |
| Example 12 | 5.55 |
| Example 13 | 5.30 |
| Example 14 | 6.10 |
| Comparative Example 1 | 5.20 |
| Comparative Example 2 | 5.00 |
| Comparative Example 3 | 4.95 |
| Comparative Example 4 | 4.85 |

As illustrated in Table 2, since secondary batteries prepared in Examples 1 to 14 of the present invention had an oxidation initiation voltage of about 5.60 V or more, it was confirmed that the secondary batteries prepared in Examples 1 to 14 exhibited excellent electrochemical (oxidation) stabilities.

In contrast, with respect to secondary batteries of Comparative Examples 1 to 4, it may be understood that oxidation initiation voltages were all less than about 5.20 V, which was lower than those of the secondary batteries of Examples 1 to 14.

Experimental Example 2. Ionic Conductivity Measurement

Specimens were prepared by using the compositions for a gel polymer electrolyte of Examples 1, 3, 5, 7, and 14 and the compositions for a gel polymer electrolyte of Comparative Examples 1 to 4. The specimens were collectively prepared according to ASTM standard D638 (Type V specimens).

Subsequently, a circular gold (Au) electrode having a diameter of 1 mm was coated on the specimens using a sputtering method.

Then, ionic conductivities were measured for the specimens prepared by using the compositions for a gel polymer electrolyte of Examples 1, 3, 5, and 7 and Comparative Examples 1 to 4 at low temperature (0° C.) and room temperature (25° C.) by using an alternating current impedance method. Also, ionic conductivity was measured for the specimen prepared by using the composition for a gel polymer electrolyte of Example 14 at room temperature (25° C.) by using an alternating current impedance method.

The ionic conductivities were measured in a frequency range of 0.1 Hz to 100 MHz using a VMP3 measurement instrument and a precision impedance analyzer (4294A), and the measurement results are presented in Table 3 below.

TABLE 3

| | 0° C., Ionic conductivity (mS/cm) | 25° C., Ionic conductivity (mS/cm) |
|---|---|---|
| Example 1 | 5.2 | 9.6 |
| Example 3 | 5.3 | 9.7 |
| Example 5 | 5.5 | 9.5 |
| Example 7 | 5.3 | 9.8 |
| Example 14 | — | 0.6 |
| Comparative Example 1 | 5.1 | 8.8 |
| Comparative Example 2 | 4.8 | 8.7 |
| Comparative Example 3 | 3.6 | 8.2 |
| Comparative Example 4 | 3.4 | 8.0 |

Referring to Table 3, it may be confirmed that the specimens prepared by using the compositions for a gel polymer electrolyte of Examples 1, 3, 5, and 7 had an ionic conductivity at 0° C. of 5.2 mS/cm or more and an ionic conductivity at 25° C. of 9.5 mS/cm or more.

In contrast, with respect to the specimens prepared by using the compositions for a gel polymer electrolyte of Comparative Examples 1 to 4, since free volume was increased and interaction with lithium ions was low due to the use of the polymer having a low weight-average molecular weight, phase stability of the gel polymer electrolyte was absent, and thus, it may be understood that the ionic conductivities at 0° C. and at 25° C. were significantly lower than those of Examples 1, 3, 5, and 7.

Since the specimen prepared by using the composition for a gel polymer electrolyte prepared in Example 14, in which an excessive amount of the oligomer was included, corresponded to a case where the amount of the oligomer was only increased under the same condition, movement characteristics of the solvent were significantly degraded due to an increase in the amount of the polymer, and thus, it may be confirmed that the ionic conductivity at 25° C. was significantly reduced to 0.6 mS/cm.

Experimental Example 3. Resistance Evaluation

A positive electrode active material (LiNi$_{1/3}$Co$_{1/3}$Mn$_{1/3}$O$_2$; NCM), carbon black as a conductive agent, and polyvinylidene fluoride (PVDF), as a binder, were added in a weight ratio of 94:3:3 to N-methyl-2-pyrrolidone (NMP) to prepare a positive electrode mixture slurry (solid content of 50 wt %). An about 20 μm thick aluminum (Al) thin film, as a positive electrode collector, was coated with the positive electrode mixture slurry and dried, and the coated Al thin film was then roll-pressed to prepare a positive electrode.

Graphite as a negative electrode active material, PVDF as a binder, and carbon black, as a conductive agent, were added in a weight ratio of 96:3:1 to NMP, as a solvent, to prepare a negative electrode mixture slurry. A 10 μm thick copper (Cu) thin film, as a negative electrode collector, was coated with the negative electrode mixture slurry and dried, and the coated Cu thin film was then roll-pressed to prepare a negative electrode.

After an electrode assembly was prepared by sequentially stacking a separator formed of three layers of polypropylene/polyethylene/polypropylene (PP/PE/PP) between the positive electrode and the negative electrode, the assembled electrode assembly was accommodated in a battery case, each of the compositions for a gel polymer electrolyte prepared in Examples 1, 3, 5, 7, and 10 to 13 and the compositions for a gel polymer electrolyte prepared in Comparative Examples 1 to 4, to which a 2% VC additive was added, was injected thereinto, and aging was then performed for 2 days. Thereafter, curing was performed at 70° C. for 5 hours to prepare a pouch type lithium secondary battery (4.25 V, 30 mAh) including a thermally polymerized gel polymer electrolyte.

Each of the lithium secondary batteries was fully charged at a constant current-constant voltage of 0.33 C/4.2 V in an operating voltage range of 3.0 V to 4.2 V, and discharged at 2.5 C for 10 seconds at a state of charge (SOC) of 50%, initial capacity when discharged was measured using PNE-0506 charge/discharge equipment (manufacturer: PNE SOLUTION Co., Ltd., 5 V, 6 A), and the results thereof are presented in Table 4 below.

Also, a voltage drop when discharged was measured using PNE-0506 charge/discharge equipment (manufacturer: PNE SOLUTION Co., Ltd., 5 V, 6 A). Resistance increased relative to initial resistance for each secondary battery was expressed as a percentage using the obtained voltage drop, and the results thereof are listed in Table 4 below.

TABLE 4

| | Capacity (mAh) | 25° C. 2.5 C, 10 sec Resistance (%) |
|---|---|---|
| Example 1 | 29.3 | 103.5 |
| Example 3 | 29.1 | 102.5 |
| Example 5 | 29.4 | 102.6 |
| Example 7 | 29.3 | 103.0 |
| Example 10 | 29.3 | 103.5 |
| Example 11 | 29.3 | 103.5 |
| Example 12 | 29.3 | 101.5 |
| Example 13 | 29.3 | 100 |
| Comparative Example 1 | 28.4 | 115 |
| Comparative Example 2 | 28 | 117 |
| Comparative Example 3 | 26 | 125 |
| Comparative Example 4 | 27 | 130 |

Referring to Table 4, initial capacities of the lithium secondary batteries including the compositions for a gel polymer electrolyte prepared in Examples 1, 3, 5, 7, and 10 to 13 of the present invention were about 29.1 mAh or more, but initial capacities of the lithium secondary batteries including the compositions for a gel polymer electrolyte prepared in Comparative Examples 1 to 4 were about 28.4 mAh or less, wherein it may be understood that these initial capacity values were inferior to those of the lithium secondary batteries including the compositions for a gel polymer electrolyte prepared in Examples 1, 3, 5, 7, and 10 to 13.

Also, resistance values of the lithium secondary batteries including the compositions for a gel polymer electrolyte prepared in Examples 1, 3, 5, 7, and 10 to 13 of the present invention were about 103.5% or less, but resistance values of the lithium secondary batteries including the compositions for a gel polymer electrolyte prepared in Comparative Examples 1 to 4 were about 115% or more, wherein it may be understood that these resistance values were significantly increased in comparison to those of the lithium secondary batteries including the compositions for a gel polymer electrolyte prepared in Examples 1, 3, 5, 7, and 10 to 13.

Experimental Example 4. Calorific Value Evaluation

After the secondary batteries including the compositions for a gel polymer electrolyte of Examples 1, 3, 5, 7, 8, and 10 to 13 prepared in Experimental Example 3, the secondary batteries including the compositions for a gel polymer electrolyte of Comparative Examples 1 to 4, and the secondary battery including the composition for a gel polymer electrolyte of Comparative Example 5 were respectively fully charged at a SOC of 100%, a calorific value of each cell was measured using a MMC instrument (Multiple Module Calorimeter, MMC 274, NETZSCH) while each secondary battery was introduced into a chamber at 150° C. and stored for 4 hours. The results thereof are listed in Table 5 below.

TABLE 5

| | Calorific value (J/g) |
|---|---|
| Example 1 | 70 |
| Example 3 | 65 |
| Example 5 | 72 |
| Example 7 | 64 |
| Example 8 | 20 |
| Example 10 | 70 |
| Example 11 | 70 |
| Example 12 | 75 |
| Example 13 | 160 |
| Comparative Example 1 | 100 |
| Comparative Example 2 | 120 |
| Comparative Example 3 | 150 |
| Comparative Example 4 | 180 |
| Comparative Example 5 | >200 |

Referring to Table 5, it may be understood that calorific values of the lithium secondary batteries including the compositions for a gel polymer electrolyte prepared in Examples 1, 3, 5, 7, 8, and 10 to 12 of the present invention were 75 J/g or less, but calorific values of the lithium secondary batteries including the compositions for a gel polymer electrolyte prepared in Comparative Examples 1 to 4 were greater than 100 J/g.

Particularly, it may be understood that the calorific value of the lithium secondary battery, which included the composition for a gel polymer electrolyte of Example 8 including 20 wt % of the oligomer, was significantly improved to 20 J/g.

In contrast, calorific value of the secondary battery including the composition for a gel polymer electrolyte of Comparative Example 5 was greater than 200 J/g, wherein it may be understood that the calorific value was significantly inferior to those of the lithium secondary batteries including the compositions for a gel polymer electrolyte prepared in Examples 1, 3, 5, 7, and 8.

With respect to the lithium secondary battery including the composition for a gel polymer electrolyte of Example 13, since stability was reduced as the amount of the oligomer was relatively reduced, it may be understood that its calorific value was increased in comparison to those of the lithium secondary batteries including the compositions for a gel polymer electrolyte prepared in Examples 1, 3, 5, 7, 8, and 10 to 12.

The above descriptions are merely exemplary embodiments for preparing the gel polymer electrolyte according to the present invention and the secondary battery including the same, so that the present invention is not limited thereto. The true scope of the present invention should be defined to the extent that those skilled in the art can make various modifications and changes thereto without departing from the scope of the invention, as defined by the appended claims.

The invention claimed is:

1. A composition for a gel polymer electrolyte, the composition comprising a lithium salt, a non-aqueous organic solvent, a polymerization initiator, and an oligomer, wherein the oligomer comprises at least one selected from the group consisting of oligomers represented by Formula 1 and Formula 2:

[Formula 1]

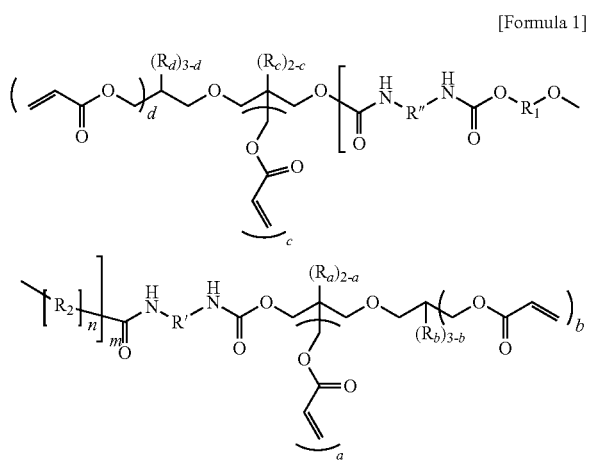

wherein, in Formula 1,
R' and R" are each independently an aliphatic hydrocarbon group or an aromatic hydrocarbon group, $R_1$ is a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, a substituted or unsubstituted heterocycloalkylene group having 2 to 20 carbon atoms, —CO—O—R—, where R is an alkylene group having 1 to 10 carbon atoms, —$R_o$—CO—, where $R_o$ is an alkylene group having 1 to 10 carbon atoms, or —$R_i$—O—$R'_i$—, where $R_i$ and $R'_i$ are each independently a substituted or unsubstituted alkylene group having 1 to 10 carbon atoms, $R_2$ is —CO—O—$R_3$—O—, where $R_3$ is a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, a substituted or unsubstituted heterocycloalkylene group having 2 to 20 carbon atoms, —CO—O—R—, where R is an alkylene group having 1 to 10 carbon atoms, —$R_j$—CO—, where $R_j$ is an alkylene group having 1 to 10 carbon atoms, or —$R_k$—O—$R'_k$—, where $R_k$ and $R'_k$ are each independently a substituted or unsubstituted alkylene group having 1 to 10 carbon atoms, or —$R_4$—CO—O—, where $R_4$ is a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, or a substituted or unsubstituted heterocycloalkylene group having 2 to 20 carbon atoms), $R_a$, $R_b$, $R_c$, and $R_d$ are each independently hydrogen or an alkyl group having 1 to 3 carbon atoms, n is an integer of 1 to 100, and
m is an integer of 1 to 100,
a and c are each independently an integer of 0 to 2, and
b and d are each independently an integer of 1 to 3:

[Formula 2]

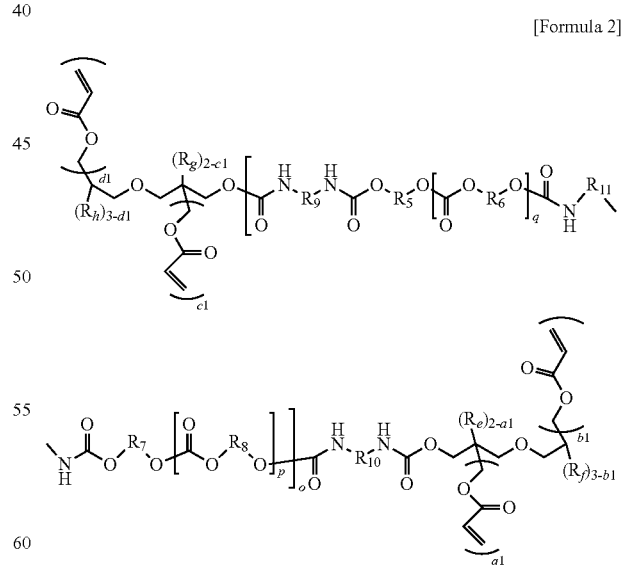

wherein, in Formula 2,
$R_5$, $R_6$, $R_7$, and $R_8$ are each independently a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, a substituted or unsubstituted heterocycloalkylene group having 2 to 20 carbon atoms, —CO—O—$R_m$—, where $R_m$ is an alkylene group having 1 to 10 carbon atoms, —$R_n$—CO—, where $R_n$ is an alkylene group having 1 to 10 carbon atoms, or —$R_{12}$—O—$R_{13}$—, where $R_{12}$ and $R_{13}$ are each independently a substituted or unsubstituted alkylene group having 1 to 10 carbon atoms, $R_9$, $R_{10}$, and $R_{11}$ are each independently an aliphatic hydrocarbon group or an aromatic hydrocarbon group, $R_e$, $R_f$, $R_g$, and $R_h$ are each independently hydrogen or an alkyl group having 1 to 3 carbon atoms, o is an integer of 1 to 100, p is an integer of 1 to 100, and q is an integer of 1 to 100, a1 and c1 are each independently an integer of 0 to 2, and b1 and d1 are each independently an integer of 1 to 3.

2. The composition for a gel polymer electrolyte of claim 1, wherein, in Formula 1, R' and R" are aliphatic hydrocarbon groups, $R_1$ is at least one selected from the group consisting of a substituted or unsubstituted alkylene group having 2 to 8 carbon atoms, a substituted or unsubstituted cycloalkylene group having 4 to 10 carbon atoms, a substituted or unsubstituted arylene group having 6 to 15 carbon atoms, a substituted or unsubstituted heterocycloalkylene group having 2 to 10 carbon atoms, —CO—O—R—, where R is an alkylene group having 2 to 8 carbon atoms, —$R_o$—CO—, where $R_o$ is an alkylene group having 2 to 8 carbon atoms, and —$R_i$—O—$R'_i$—, where $R_i$ and $R'_i$ are each independently a substituted or unsubstituted alkylene group having 1 to 8 carbon atoms, and $R_2$ is —CO—O—$R_3$—O—, where $R_3$ is a substituted or unsubstituted alkylene group having 2 to 8 carbon atoms, a substituted or unsubstituted cycloalkylene group having 4 to 10 carbon atoms, a substituted or unsubstituted arylene group having 6 to 15 carbon atoms, a substituted or unsubstituted heterocycloalkylene group having 2 to 10 carbon atoms, —CO—O—R—, where R is an alkylene group having 1 to 10 carbon atoms, —$R_j$—CO—, where $R_j$ is an alkylene group having 2 to 8 carbon atoms, or —$R_k$—O—$R'_k$—, where $R_k$ and $R'_k$ are each independently a substituted or unsubstituted alkylene group having 1 to 8 carbon atoms, or —$R_4$—CO—O—, where $R_4$ is a substituted or unsubstituted alkylene group having 2 to 8 carbon atoms, a substituted or unsubstituted cycloalkylene group having 4 to 10 carbon atoms, a substituted or unsubstituted arylene group having 6 to 15 carbon atoms, or a substituted or unsubstituted heterocycloalkylene group having 2 to 10 carbon atoms.

3. The composition for a gel polymer electrolyte of claim 1, wherein, in Formula 1, $R_1$ is at least one selected from the group consisting of a propylene group, a butylene group, a pentylene group, a hexylene group, a cyclopentylene group, a cyclohexylene group, —CO—O—$(CH_2)_5$—, —$(CH_2CH_2OCH_2CH_2)_r$—, where r is an integer of 1 to 10, and —$(CH_2)_5$—CO—, and $R_2$ is at least one selected from the group consisting of —CO—O—$R_3$—O— (where $R_3$ is a propylene group, a butylene group, a pentylene group, a hexylene group, a cyclopentylene group, a cyclohexylene group, or —$(CH_2CH_2OCH_2CH_2)_{r1}$—, where r1 is an integer of 1 to 10, and —$(CH_2)_5$—CO—O—.

4. The composition for a gel polymer electrolyte of claim 1, wherein the oligomer represented by Formula 1 comprises at least one selected from the group consisting of compounds represented by Formula 1a to Formula 1c:

[Formula 1a]

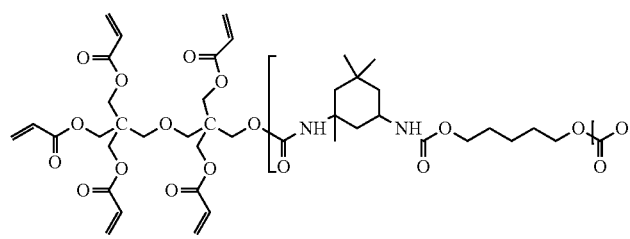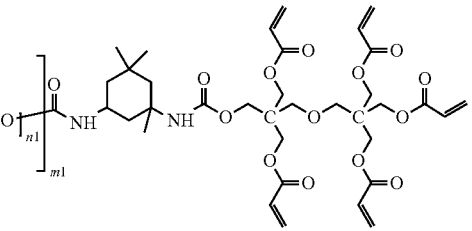

wherein, in Formula 1a, n1 is an integer of 1 to 100, and m1 is an integer of 1 to 100;

[Formula 1b]

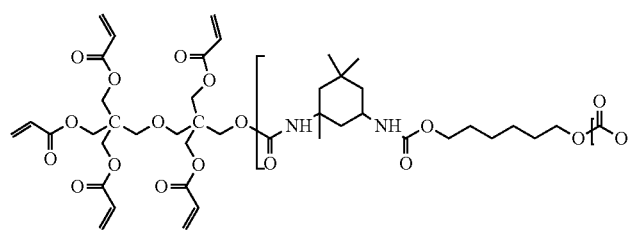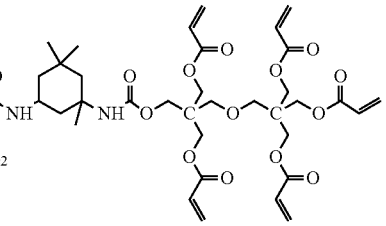

wherein, in Formula 1b,
n2 is an integer of 1 to 100, and
m2 is an integer of 1 to 100;

[Formula 1c]

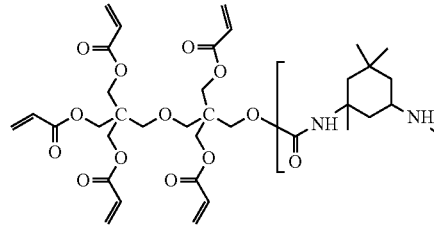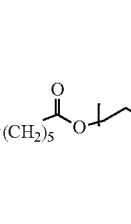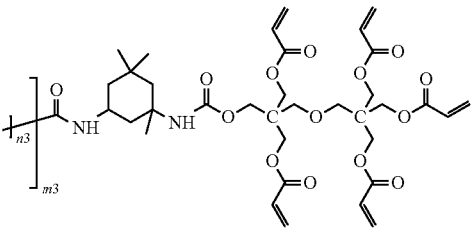

wherein, in Formula 1c,
n3 is an integer of 1 to 100, and
m3 is an integer of 1 to 100.

5. The composition for a gel polymer electrolyte of claim 1, wherein, in Formula 2,
$R_9$, $R_{10}$, and $R_{11}$ are aliphatic hydrocarbon groups, and
$R_5$, $R_6$, $R_7$, and $R_8$ are each independently at least one selected from the group consisting of a substituted or unsubstituted alkylene group having 2 to 8 carbon atoms, a substituted or unsubstituted cycloalkylene group having 4 to 10 carbon atoms, a substituted or unsubstituted arylene group having 6 to 15 carbon atoms, a substituted or unsubstituted heterocycloalkylene group having 2 to 10 carbon atoms, —CO—O—$R_m$—, where $R_m$ is an alkylene group having 2 to 8 carbon atoms), —$R_n$—CO—, where $R_n$ is an alkylene group having 2 to 8 carbon atoms, and —$R_{12}$—O—$R_{13}$—, where $R_{12}$ and $R_{13}$ are each independently a substituted or unsubstituted alkylene group having 1 to 8 carbon atoms.

6. The composition for a gel polymer electrolyte of claim 1, wherein, in Formula 2, $R_5$, $R_6$, $R_7$, and $R_8$ are each independently at least one selected from the group consisting of a propylene group, a butylene group, a pentylene group, a hexylene group, a cyclopentylene group, a cyclohexylene group, —CO—O—$(CH_2)_5$—, —$(CH_2CH_2OCH_2CH_2)_{r2}$—, where r2 is an integer of 1 to 10, and —$(CH_2)_5$—CO—.

7. The composition for a gel polymer electrolyte of claim 1, wherein the oligomer represented by Formula 2 comprises at least one selected from the group consisting of compounds represented by Formula 2a:

[Formula 2a]

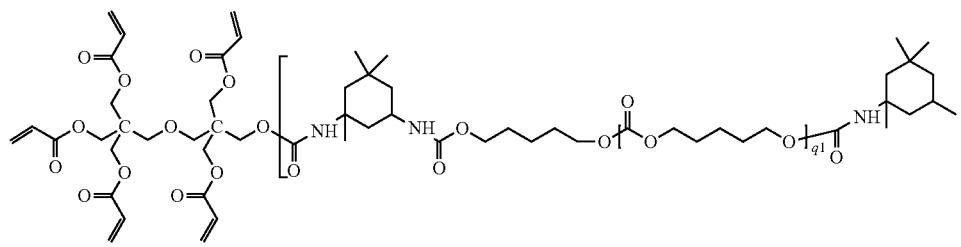

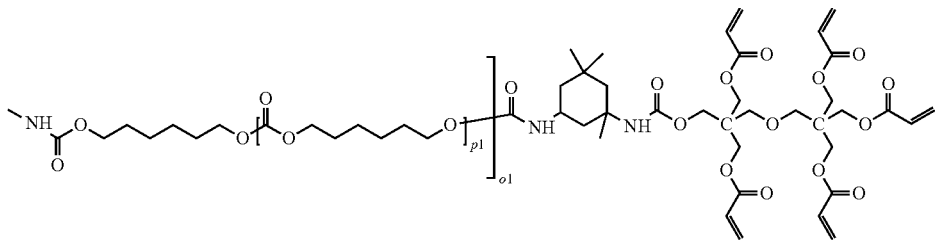

wherein, in Formula 2a,
o1 is an integer of 1 to 100,
p1 is an integer of 1 to 100, and
q1 is an integer of 1 to 100.

8. The composition for a gel polymer electrolyte of claim 1, wherein the oligomer is included in an amount of 0.1 wt % to 35 wt % based on a total weight of the composition for a gel polymer electrolyte.

9. The composition for a gel polymer electrolyte of claim 1, wherein the oligomer is included in an amount of 0.5 wt % to 30 wt % based on a total weight of the composition for a gel polymer electrolyte.

10. A gel polymer electrolyte comprising a polymerized compound of the composition for a gel polymer electrolyte of claim 1.

11. A lithium secondary battery comprising the gel polymer electrolyte of claim 10.

* * * * *